Feb. 12, 1952  P. LETRILLIART ET AL  2,585,392
MONOPOLYPHASE FREQUENCY CONVERTER GROUP
Filed March 15, 1949  2 SHEETS—SHEET 1

Inventors
Pierre Letrilliart
Louis Galzin

By Shoemaker & Mattare
Attorneys

Patented Feb. 12, 1952

2,585,392

UNITED STATES PATENT OFFICE 2,585,392

MONOPOLYPHASE FREQUENCY CONVERTER GROUP

Pierre Letrilliart and Louis Galzin, Jeumont, Nord, France, assignors to Forges & Ateliers de Constructions Electriques de Jeumont, Paris, France, a French body corporate.

Application March 15, 1949, Serial No. 81,518
In France March 19, 1948

6 Claims. (Cl. 321—7)

This invention consists of a mono-polyphase frequency convertor group, for converting single-phase current to polyphase, or vice versa, and for changing the frequency as desired.

The invention has for its main object to provide a mono-polyphase frequency convertor in the form of a rotary group in which the input energy is converted both mechanically and electrically.

Another object of the invention is to provide a rotary group of this character in which the regulation of the output voltage and frequency is effected by variation of the speed.

A specific object of the invention is to provide a rotary frequency convertor group for use upon single-phase electric traction systems for feeding traction motors of asynchronous polyphase type at variable frequency.

Other objects and advantages of the invention will hereinafter appear from the following description of a preferred embodiment, given with reference to the accompanying drawings, in which.

Figure 1:
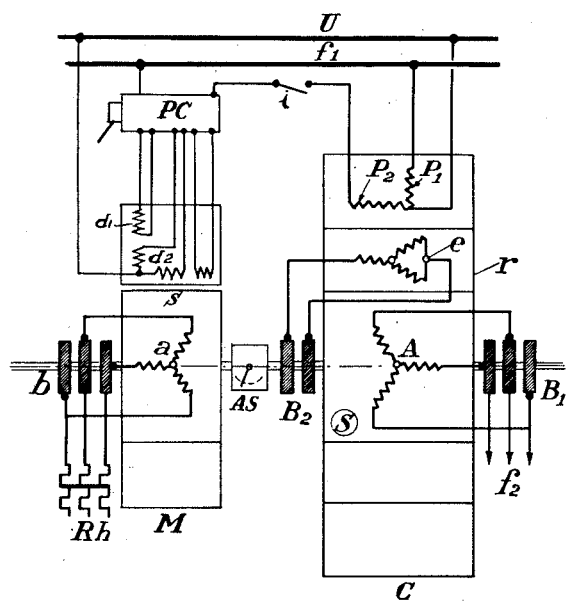
Fig. 1 represents diagrammatically an embodiment of a mono-polyphase frequency convertor group.

Referring to Fig. 1, the frequency convertor group is composed of a polyphase motor M of any suitable known type having a variable number of poles or variable speed, capable of operating as a generator and mounted mechanically upon the shaft of a mono-triphase frequency convertor C. The primary of the convertor C is connected to a single-phase supply system U having normal frequency $f_1$, while the secondary S takes the form of a main rotor which revolves at a variable speed. This secondary consists of a normal polyphase winding A provided with output slip-rings $B_1$.

The frequency convertor C also includes an auxiliary rotor $r$ of the known type carrying a suitable winding $e$; this auxiliary rotor can revolve freely in the magnetic gap of the main rotor S. The winding $e$ can be fed with direct current at the rings $B_2$. By means of circuits connected in parallel, it can perform simultaneously the offices of exciter winding and damper for the inverse field; it can be wound according to other known systems; or comprise likewise one or more cages acting as dampers.

The auxiliary or intermediate rotor $r$ revolves in synchronism with one of the rotating fields into which the alternating field produced by the single-phase current supplied at U can be decomposed. The main rotor S can revolve in the opposite direction to the undamped field, or in the same direction; the two concentric rotors $r$ and S thus revolve either in opposite directions to one another or in the same direction. At the output rings $B_2$ of the secondary winding A, there will appear a polyphase voltage and a frequency $f_2$ which will depend upon the speed and direction of rotation of this secondary winding.

The motor M, which will be assumed to be two-phase for simplicity of explanation, but which could be provided with a three-phase winding, for example, is fed on the one hand by the single-phase supply line U, and on the other hand by the free second phase $P_2$ from the stator of the frequency convertor C which will be assumed to be likewise two-phase.

At starting, the auxiliary rotor $r$ of the frequency convertor C is first set running so that a two-phase voltage is produced in the stator. The motor M can then be fed completely by the closure of a switch $i$ and started up. The stator of the frequency convertor C supplies a portion of the electrical power required for the motor M, as will be explained hereinafter.

The motor M may take the form of a variable-speed commutator motor or of a motor having a rotor provided with slip-rings or with a short-circuited rotor winding, and may be of pole-changing type, etc.

The drawing shows a conventional device PC for changing the number of stator poles of the motor M; this device being inserted between the mains of the supply system U and the stator phase windings.

It would also be possible to utilize a motor having one or more substantially constant or synchronous speeds, and driving the variable speed frequency convertor C by means of a magnetic, mechanical or hydraulic transmission of a known type.

The operation of the group as described can be explained in the following manner:

When the two rotors $r$ and S revolve in opposite directions, the following relation between the frequencies $f_1$ of the supply line U and $f_2$ of the frequency convertor secondary A is obtained:

$$f_2 = f_1\left(\frac{p^1}{p^2}+1\right)$$

$p^1$ being the number of poles of the frequency convertor C and $p_2$ the number of poles of the motor M (if it is designed for pole-changing).

When the rotor S is stationary, the frequency $f_2$ is equal to the supply frequency $f_1$ of the stator. As the speed rises, the frequency $f_2$ increases as in an ordinary induction convertor.

Setting aside the power transmitted to the motor M by the stator of the frequency convertor C, the following equation is obtained:

$$P_m = P_s \left(1 - \frac{f_1}{f_2}\right)$$

$P_s$ being the load on the secondary S, and $P_m$ the power mechanically supplied by the motor.

The total power is given by:

$$P_s = P_c + P_m$$

$P_c$ being the power directly converted in the frequency convertor C.

It should be noted that the polyphase voltage of a frequency equal to that of the supply line can be obtained across the terminals of the stator, either directly, or by means of a transformer, if the secondary of the frequency convertor C is open and the intermediate rotor is revolving in synchronism.

It would, of course, be possible to obtain momentarily a frequency $f_2$ lower than the primary frequency $f_1$ by driving the rotor S in the same direction as the intermediate rotor $r$. In this case, the main rotor S of the frequency convertor C supplies the whole load of the secondary and an additional power to the shaft, which is returned to the supply line by the motor M.

As represented in Fig. 1, the stators of the machines M and C are respectively provided with two-phase windings $d_1$, $d_2$ and $P_1$, $P_2$, of which the phase windings $d_1$ and $P_1$ are connected to the supply line U.

The phase $P_2$ of the frequency convertor is used, according to one of the known methods (inductance, capacity, resistance or the like), for speeding up the auxiliary rotor $r$.

As soon as the auxiliary rotor reaches the speed of synchronism, the winding $P_2$ is connected to the winding $d_2$ by means of the switch $i$, and the stator of the motor M is thus effectively fed with two-phase current.

The motor M is then started like a normal motor having a slip-ring rotor $s$ and an external rheostat R$h$ connected to the slip-rings $b$. This rheostat can also be used to vary the speed during running.

As soon as the rotor of this motor M rotates, there appears at the rings $B_1$ of the winding A on the rotor S of the frequency convertor C, a frequency $f_2$, different from that of the supply line $f_1$, being lower or higher according to whether the rotor S is revolving in the same direction as or in the opposite direction to the auxiliary rotor $r$.

The machine C operates simultaneously by means of its primary and secondary windings as a phase convertor, and its main rotor S furthermore operates as a frequency changer.

When the frequency $f_2$ is higher than $f_1$, the frequency convertor C absorbs from the supply line the fraction of power which is converted by induction from the frequency $f_1$ to the frequency $f_2$, as well as the power supplied to the winding $d_2$ of the motor through the switch $i$.

By way of example, a frequency convertor C having 8 poles and a motor M with three pole changes (or two motors in cascade), operating at speeds of 1500, 750 and 500 revolutions per minute, would enable different frequencies to be obtained, corresponding to various synchronous speeds, with a 50 cycle supply system. The frequency of 50 cycles is obtained by stopping the main rotor S or directly from the stator of the frequency convertor C; the intermediate frequencies can be obtained by inserting the slip rheostat R$h$. The economical frequencies are: 50, 83, 100 and 150 cycles.

The motor M with three pole changes could, for example, be constructed as a two-phase motor by means of two separate windings on each member: first a two-phase winding for four and eight poles with eight terminals, according to a known mode of coupling, and secondly a two-phase winding of lower power for twelve poles with four terminals.

The rotor of the motor M could be arranged for rheostatic control at only one or two pole numbers, the winding being automatically short-circuited at certain pole changes according to one of the known methods.

The frequency convertor C and the motor M can be wound for three-phase operation, or there can be interposed between the stator of the frequency convertor C and the motor M a phase-transformer, using one of the known couplings with several pole numbers. In the case of stators wound for three-phase operation, the necessary frequency $f_1$ for feeding the three-phase load motors supplied by the group can be obtained directly from the stator of the frequency convertor C, the winding of the main rotor S being open.

Figure 2:
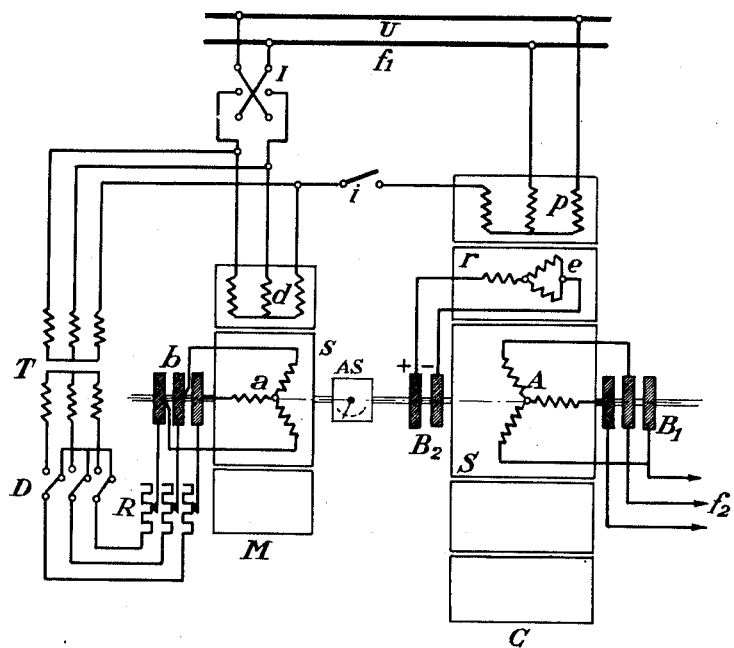
Fig. 2 shows the arrangement of its driving and controlling means.

Fig. 2 indicates the means for controlling the slowing down and stopping of the motor M with the object of regulating the frequency $f_2$. In this figure, it is assumed that the stators of the frequency convertor C and the motor M are provided with three-phase windings.

A reversing switch I is inserted between the mains U and a part of the stator windings $d$ of the motor M. Between this stator and the rotor there is inserted a transformer T, the purpose of which is explained below.

First, the rotating stator field of the motor M is reversed by the reversing switch I, its rotor $s$ being closed across resistances R, which produce an adjustable braking torque; the supply phase which is connected to the frequency convertor by the switch $i$ is then interrupted, and in order to bring the motor M to a complete standstill, its stator voltage is applied to its rings $b$ by means of a suitable transformer T and an optimum resistance, fixed or adjustable.

For this purpose, the rings $b$ of the motor M are connected by means of variable resistances R to a three-pole double-throw switch D, which, in the right-hand position shown in Fig. 2, connects the ends of these resistances to one another forming a resistance neutral; in its left-hand position, it connects them to the terminals of the transformer T, the other winding of which is connected to the stator $d$. The reversing switch I makes it possible to reverse the connections between the stator $d$ of the motor and the supply line of the mains system, which is of the primary frequency $f_1$ and voltage U.

To brake the motor M, the rotating field of the stator $d$ is reversed by means of the reversing switch I and the resistances R of the rotor $s$ are suitably adjusted, the three-pole switch D being in its right-hand position. By then throwing the switch D to the left the transformer T will also be connected in the circuit of the rings b, in addition to the suitably adjusted resistances R, so that the voltage of the stator d is applied to the rotor, and the switch i is opened.

Under these conditions, the motor M is stopped, and in order to increase the torque which holds it stationary, the resistances R may be decreased.

The foregoing operations, which depend on the speed, voltage or frequency of the rotor s, can be effected by means of contactors, grouped to form a single controller and actuated by a camshaft for example, or by relays or any other actuating device.

Figure 3:
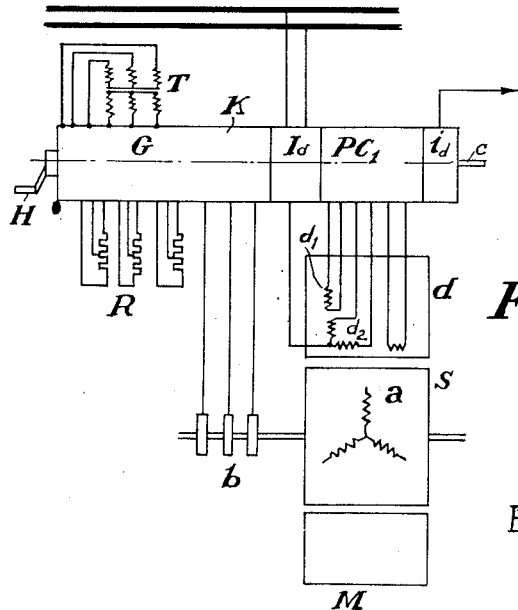
Fig. 3 is a diagram illustrating a single controller for effecting in a desired order all starting and regulating connections of the convertor group.

Such a cam-actuated controller device is represented in Fig. 3, wherein a camshaft c rotatable by means of a handle H actuates several groups of contactors, viz. a group $i_1$ replacing the switch $i$ of Fig. 1, a group $I_1$ replacing the reversing switch I of Fig. 2, and a group G replacing the double-throw switch D and the means for adjusting the resistances R of Fig. 2.

If the voltages of the rotor s and stator d are equal, the transformer T may be dispensed with and there need only be used resistances R, of variable or of suitable fixed value.

The regulating system described, which is applicable for any number of phases, can also be applied to the frequency convertor C; in this case the electrical energy passes directly from the rotor S to the stator P, these two members being electrically connected, as already explained for the motor M.

This group described may be fed with high or low tension current. The transmission of power is reversible; power may be transmitted also from the system operating at frequency $f_2$ to the system operating at frequency $f_1$.

The frequency and phase convertor can be employed in particular in single-phase traction to feed from a single-phase line U through the intermediary of the output rings $B_1$ and at a variable frequency $f_2$ asynchronous polyphase traction motors of any type, with wound or short-circuited rotors; the motors can be geared to the driving axles with single or double speed-reduction. The design of these motors can for example be facilitated by the use of rotors having a resistance which is increased automatically at starting, such as double cage rotors having a suitable torque-speed characteristic.

The power factor of such a traction system can be regulated by direct-current excitation of the auxiliary or intermediate rotor r of the frequency convertor, which allows the use of traction motors having a large magnetic gap; if necessary, these motors can be supplied at a relatively high frequency, and their flux can be increased at starting.

What we claim is:

1. In a system for energizing multiple phase load motors from single phase mains by a conventional frequency convertor set formed by a polyphase driving motor capable of operating as a generator and a frequency convertor having a polyphase stator, a polyphase main rotor with output slip-rings driven by said motor and an intermediate freely revolving rotor with a direct current field winding, means for starting and controlling in both directions the speed of said frequency convertor, comprising means for partial interconnection of the polyphase stator windings of said driving motor and of said convertor with said mains, and switching devices adapted to interconnect separately the remaining parts of both said stator windings, whereby a regular rotating field is produced in said driving motor.

2. In a system for energizing multiple phase load motors from single phase mains by a conventional frequency convertor set formed by a polyphase driving motor capable of operating as a generator and a frequency convertor having a polyphase stator, a polyphase main rotor with output slip-rings driven by said motor and an intermediate freely revolving rotor with a direct current field winding, means for starting, immobilizing and controlling in both directions the speed of said frequency convertor, comprising means for partial interconnection of the respective polyphase stator windings of said driving motor and of said convertor with said mains, a switching device adapted to interconnect separately the remaining parts of both said polyphase windings, an adjustable rheostat and switching means adapted to interconnect the stator and the rotor of said driving motor through said rheostat, whereby said motor is immobilized, said switching means being adapted to connect the same rheostat as a slip resistance of said driving motor for starting and speed regulating.

3. In a frequency convertor set for energizing a polyphase load from constant frequency single phase mains, said set being of the type formed by a motor capable of operating as a generator, a frequency convertor including a polyphase stator, a polyphase main rotor with output slip-rings driven by said motor and an auxiliary rotor with direct current excitation adapted to revolve freely at synchronous speed in the magnetic gap of said convertor, a control system for obtaining a plurality of output frequencies, comprising a reversing switch interposed between said mains and a part of the primary windings of said motor, means for permanent interconnection between said mains and a part of the primary windings of said convertor, a switch interconnecting separately the remaining parts of the primary windings of said motor and convertor in order to produce in said motor a regular rotating field, and conventional motor-control means adapted for providing in both directions a plurality of speeds of said convertor, including a double-throw switch, a pole changing device and a single slip rheostat, all interconnected with said motor and grouped to form a step-by-step controller.

4. In a frequency convertor set, according to claim 3, an adjustable speed transmission interposed in the mechanical drive between said motor and said convertor main rotor.

5. In a frequency convertor set for energizing at different frequencies polyphase load motors from constant frequency single phase mains, said set being of the type having a multiple phase driving motor and a frequency convertor with a polyphase stator, a polyphase main rotor with output slip-rings driven by said motor and a conventional intermediate freely rotating synchronous rotor with direct current field, means for producing a regular polyphase energization of said driving motor and said convertor, comprising means for partial energization of the respective stator windings of said motor and said convertor by said mains and a switch interconnecting the remaining parts of both said stator windings, said polyphase motor being of the slip-ring induction type provided with a reversing switch, a single adjustable rheostat, a pole changing device and a double throw switch connected to the terminals of said rheostat, said double-throw switch being adapted to form in one of its positions a resistance neutral and in the opposite position an interconnection between the primary and the secondary of said motor, whereby said motor can be started in either direction by said rheostat to reach different speeds, as well as immobilized by means of said double throw switch.

6. In a frequency convertor set, according to claim 5, the formation of all said switching means by cam contactors grouped to form a single controller adapted to effect in a desired order all starting and speed regulating connections.

PIERRE LETRILLIART.
LOUIS GALZIN.

REFERENCES CITED

The following references are of record in the file of this patent:

UNITED STATES PATENTS

| Number | Name | Date |
| --- | --- | --- |
| 730,673 | Lunt | June 9, 1903 |
| 1,480,712 | Fortescue | Jan. 15, 1924 |
| 1,712,719 | Schon | May 14, 1929 |
| 1,808,435 | Punga | June 2, 1931 |
| 2,081,369 | Rossman | May 25, 1937 |
| 2,087,782 | Rossman | July 20, 1937 |
| 2,306,225 | Robinson | Dec. 22, 1942 |